United States Patent [19]

Takei et al.

[11] Patent Number: 5,223,185
[45] Date of Patent: Jun. 29, 1993

[54] METHOD OF MANUFACTURING SEAMLESS CAPSULES AND APPARATUS THEREFOR

[75] Inventors: Narimichi Takei; Kaoru Kurita, both of Tokyo, Japan

[73] Assignee: Freund Industrial Co., Ltd., Tokyo, Japan

[21] Appl. No.: 869,532

[22] Filed: Apr. 15, 1992

[30] Foreign Application Priority Data

Apr. 19, 1991 [JP] Japan .................................. 3-88560

[51] Int. Cl.$^5$ .............................................. B29B 9/10
[52] U.S. Cl. .......................................... 264/4; 264/14; 425/5; 425/10
[58] Field of Search .................... 264/4, 8, 14; 425/5, 425/8, 10

[56] References Cited

U.S. PATENT DOCUMENTS

| | | | |
|---|---|---|---|
| 2,531,986 | 11/1950 | Pile et al. ................................. | 425/5 |
| 2,911,672 | 11/1959 | van Erven Dorens et al. ........ | 264/4 |
| 2,932,061 | 4/1960 | Jansen .................................... | 264/4 |
| 3,812,056 | 5/1974 | de la Torriente et al. ............. | 264/4 |
| 3,962,383 | 6/1976 | Hagiwara et al. ..................... | 264/4 |
| 4,426,337 | 1/1984 | Suzuki et al. .......................... | 264/4 |
| 4,481,157 | 11/1984 | Morishita et al. ..................... | 264/4.1 |

FOREIGN PATENT DOCUMENTS

| | | |
|---|---|---|
| 0294941 | 12/1988 | European Pat. Off. . |
| 2111523 | 6/1972 | France . |
| 2201129 | 4/1974 | France . |
| 62-176536 | 8/1987 | Japan ................................. 264/4 |
| 1174762 | 12/1969 | United Kingdom . |
| 1185823 | 12/1969 | United Kingdom . |
| 1276598 | 6/1972 | United Kingdom . |

OTHER PUBLICATIONS

European Search Report Application No. 92 10 6822 and Annex; Communication issued Aug. 31, 1992.

*Primary Examiner*—Mary Lynn Theisen
*Attorney, Agent, or Firm*—Kane, Dalsimer, Sullivan, Kurucz, Levy, Eisele and Richard

[57] ABSTRACT

A method of manufacturing seamless capsules, wherein multi-layer liquid flow is blown out of a multiple nozzle to form multi-layer droplets which are brought into contact with hardening liquid to be solidified to thereby manufacture the seamless capsules SC and an apparatus therefor. A groove having U-shaped section for supplying the hardening liquid and the multi-layer droplets is orientated in a direction tangent to a circular section of a hardening vessel in the hardening vessel and a helical flow is formed in the hardening liquid in the hardening vessel, whereby the multi-layer droplets are fallen, moving helically in the hardening vessel.

15 Claims, 6 Drawing Sheets

METHOD OF MANUFACTURING SEAMLESS CAPSULES AND APPARATUS THEREFOR

BACKGROUND OF THE INVENTION

1. Field of the Invention

This invention relates to a technique of manufacturing seamless capsules, and particularly to a method of manufacturing seamless capsules manufactured by use of droplets formed by blowing a liquid flow out of a nozzle, and an apparatus therefor.

2. Related Art Statements

Out of the techniques of manufacturing capsules with no seams in coating layers thereof, i.e., seamless capsules, particularly as a technique suitable for manufacturing capsules smaller in size than an ordinary soft capsule and larger in size than a microcapsule, such a method is widely known that a multi-layer liquid flow is blown out into air or liquid from a multiple nozzle such as a double nozzle and a triple nozzle to form multi-layer droplets, and the outermost layer liquid of the multi-layer droplets is caused to react with hardening liquid, to thereby obtain a seamless capsule, in which liquid in an layer is enclosed.

Furthermore, there has been used such a method that outer portions of single layer droplets, which are formed by use of a single nozzle, are solidified in hardening liquid, to thereby manufacture a seamless capsule of a single layer.

In the techniques of manufacturing the seamless capsules as described above, the outermost layer liquid of the multi-layer droplets for forming the seamless capsules is solidified, namely, hardened, by chemical reaction with a hardening liquid or by cooling with a hardening liquid. In either one of solidifying mechanisms, the droplets solidify gradually as the time for contacting the hardening liquid elapses.

Then, particles of the multi-layer droplets thus solidified are delivered to the following processes where they are separated from the hardening liquid and dried. However, if the solidifying is insufficient, then such unfavorable phenomena occur that the particles are deformed, the particles adhere to each other to agglomerate or solidified membranes are broken.

Accordingly, in order to obviate the above-described disadvantages, the time of contact between the hardening liquid for solidifying the particles and the multi-layer droplets should be satisfactorily lengthened. Particularly, in the case of the solidifying mechanism where solidifying is effected by cooling, the solidifying velocity is slow, so that the time of contact for solidifying should be extended.

Then, it is conceived that, in order to lengthen the above-described contact time, the flow velocity of the hardening liquid should be slowed down.

However, because of the following problems (A) and (B), it is difficult to adopt the lengthening of the time of contact by slowing down the flow velocity of the hardening liquid.

(A) In order to prevent the breakage and deformation of the droplets, a relative velocity between the multi-layer droplets blown out of the nozzle and the flow of the hardening liquid should be reduced as much as possible. As the velocity of the hardening liquid is slowed down, the blow-out speed of the droplets should be reduced accordingly, thus lowering the producing efficiency.

(B) Even when the above-described problem (A) is solved by some method, the density of the droplet particles in the hardening liquid is increased, and thus adhesion of unsolidified droplets tends to occur easily.

Therefore, it has heretofore been conceived that the length of a course for conveying the droplets from the contact of the multi-layer droplets with the hardening liquid to the reach of the droplets to a separating device is satisfactorily lengthened structurally, thus securing the contact time.

However, this conventional structure has the disadvantage that the apparatus is largely increased in size, particularly, in the case where the capsules is solidified with cooling liquid, thus presenting one of the difficult problems of the apparatus for manufacturing seamless capsules under the method of solidifying the multi-layer droplets.

SUMMARY OF THE INVENTION

One object or the present invention is to provide a technique of manufacturing seamless capsules, in which the contact time between the droplets and the hardening liquid can be lengthened satisfactorily.

Another object of the present invention is to provide a technique of manufacturing seamless capsules, in which a substantially long length of a flow course can be provided in a small-sized apparatus.

The above and other objects and novel characteristics of the present invention will become apparatus when referred to the following descriptions given in conjunction with accompanying drawings.

Out of the inventions disclosed in the present application, outlines of typical ones will be described briefly in the following.

That is, with the method of manufacturing seamless capsules according to the present invention, in manufacturing the seamless capsules in such a manner that at least the outermost portions of the droplets are brought into contact with the hardening liquid to be solidified, the droplets are fallen, moving helically in at least a part of the hardening liquid.

One of the apparatuses of manufacturing seamless capsules according to the present invention is an apparatus for manufacturing seamless capsules, in which at least the outermost portions of the droplets are solidified in contact with the hardening liquid, said apparatus being constructed such that said apparatus comprises: a nozzle for blowing out the droplets in the air; a hardening vessel, at least a part of which is formed into a straightly erected cylindrical shape; and a droplet conveying means orientated in a direction tangent to the hardening vessel, for conveying the droplets blown out of the nozzle; to thereby supply the hardening liquid, which accompanies the droplets, in the direction tangent to the hardening vessel so that the droplets can be helically fallen in the hardening vessel.

Further, another apparatus of manufacturing seamless capsules according to the present invention is an apparatus, in which at least the outermost portions of the droplets are solidified in contact with the hardening liquid, said apparatus comprising: a hardening vessel, at least a part of which is formed into a straightly erected cylindrical shape; a hardening liquid supply means, a supply part of which is orientated in a direction tangent to the hardening vessel, for supplying the hardening liquid in the direction tangent to the hardening vessel; and a nozzle for blowing out the droplets into the hardening liquid of the hardening liquid supply means or the hardening vessel; so that the droplets blown out into the hardening liquid can be helically fallen in the hardening liquid.

Furthermore, another apparatus of manufacturing seamless capsules according to the present invention is an apparatus in which at least the outermost portions of the droplets are solidified in contact with the hardening liquid, said apparatus comprising: a hardening vessel, at least a part of which is formed into a straightly erected cylindrical shape; a hardening liquid supply means rotatably provided in the hardening vessel; a rotatably driving means for rotating the hardening liquid supply means; and a nozzle for blowing out the droplets into the hardening liquid in the hardening liquid supply means or the hardening vessel.

With the method of manufacturing seamless capsules and the apparatus therefor according to the present invention, when the droplets are fallen through the part of the hardening liquid, the droplets move to draw a helical locus, whereby the length of the flow course of the droplets during falling becomes very long, thus substantially amounting to several times larger than the length of the hardening vessel.

Further, the hardening vessel in the apparatus according to the present invention is formed of the cylinder having an inner diameter several times larger than one of a flow course of the droplet conveying means or a piping of the hardening liquid supply means, whereby a linear velocity of the hardening liquid in this part is by far slower than a linear velocity in the flow course of the droplet conveying means or the piping of the hardening liquid supply means, so that the time of contact is further lengthened for the substantial length of the flow course of the droplets.

In this case, if the length of the droplet conveying means or the hardening liquid supply means is selected such that the solidifying is progressed to some extent before the droplets reach the hardening vessel, then the problem of mutual adhesion between the droplets can be avoided.

Thus, according to the present invention, the time of contact between the droplets and the hardening liquid becomes satisfactorily long, so that desirable seamless capsules of high quality can be obtained.

Furthermore, according to the present invention, the apparatus is small-sized and simple in construction.

Further, according to the present invention, the helical flow of the hardening liquid for moving the droplets helically can be obtained by a simplified construction.

The present invention will hereunder be described with reference to embodiments shown in the drawings.

In the drawings, same reference characters designate same or similar elements.

DETAILED DESCRIPTION OF THE PREFERRED EMBODIMENTS

Figure 1:
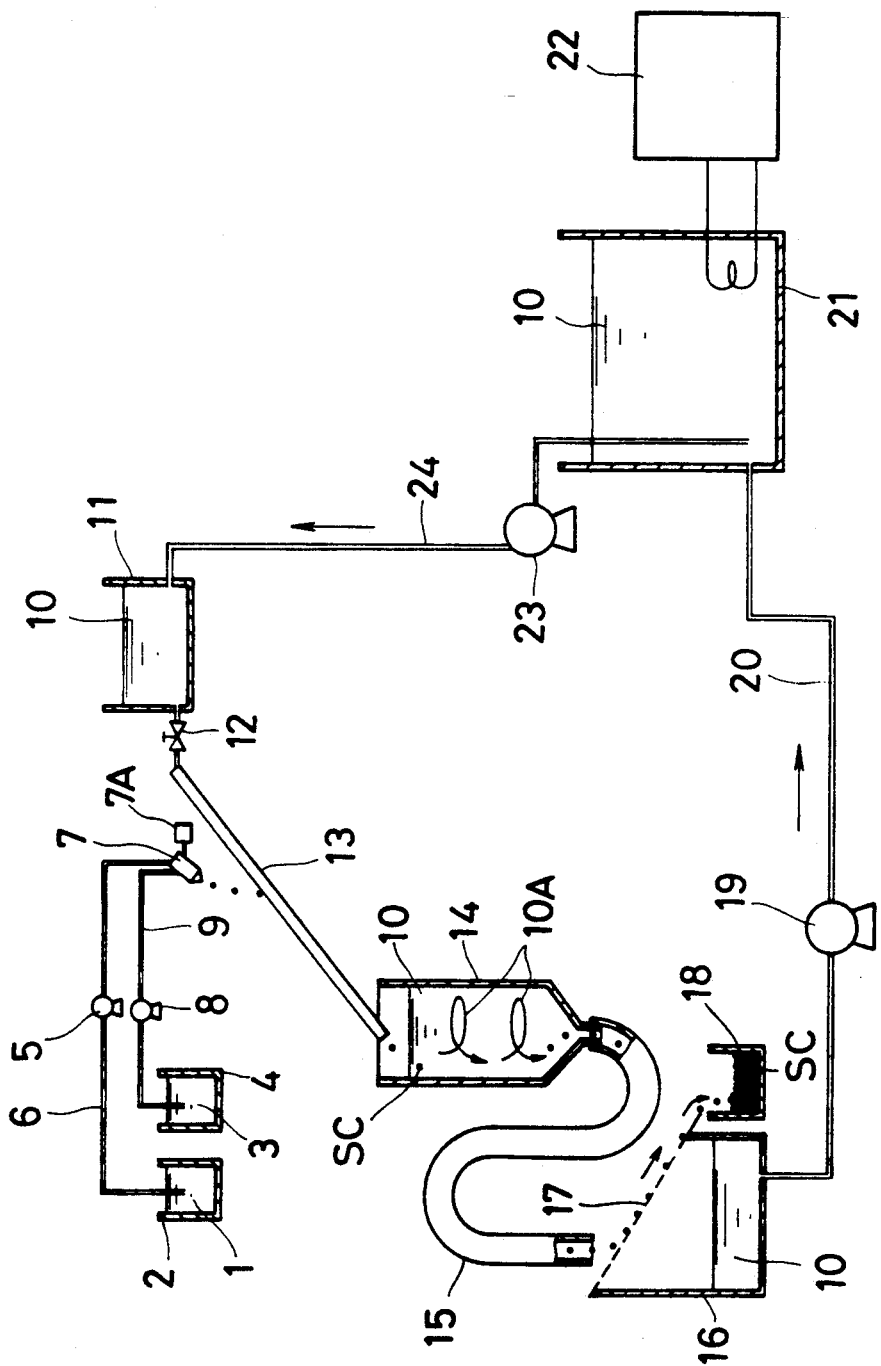
FIG. 1 is a schematic explanatory view showing one embodiment in which the present invention is applied to the apparatus for manufacturing seamless capsules of an in-air nozzle type.
Figure 2:
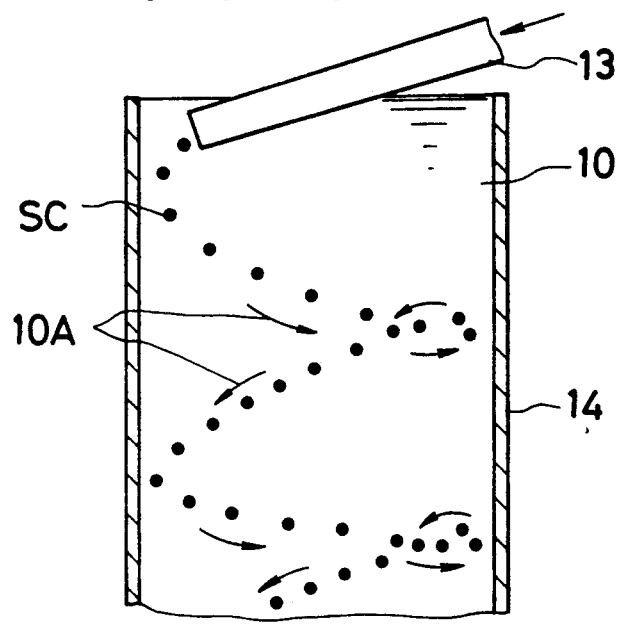
FIG. 2 is an enlarged partially longitudinally sectional view showing one embodiment of the hardening vessel in the embodiment shown in FIG. 1.
Figure 3:
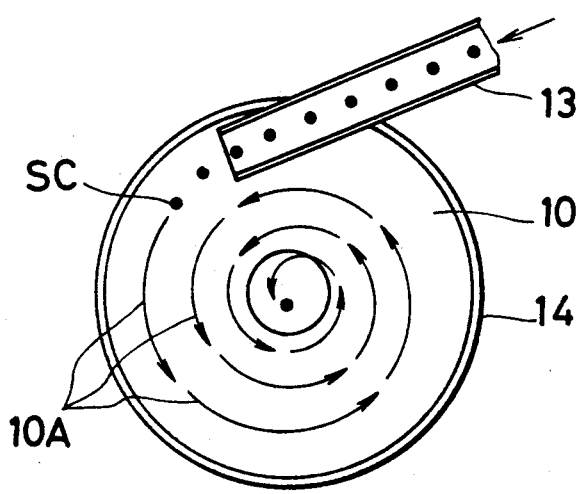
FIG. 3 is a schematically enlarged plan view showing the hardening vessel shown in FIG. 2.

Referring to the drawings, FIGS. 1 to 3 shown one embodiment in which the present invention is applied to the in-air nozzle type apparatus for manufacturing seamless capsules of the, FIG. 1 is the schematic explanatory view of the apparatus, FIG. 2 is the enlarged partially longitudinally sectional view of the hardening vessel in the embodiment shown in FIG. 1, and FIG. 3 is the schematically enlarged plan view of the hardening vessel.

In the apparatus for manufacturing seamless capsules of the in-air nozzle type as shown in FIG. 1, core liquid (inner layer liquid) 1 for forming seamless capsules is stored in a core liquid tank 2, and encapsulating liquid (outer layer liquid) 3 for covering the core liquid 1 is stored in a coating liquid tank 4.

The core liquid 1 is delivered under pressure from the core liquid tank 2 to a multiple nozzle 7 through a piping 6, while the encapsulating liquid 3 is delivered under pressure from the coating liquid tank 4 to the multiple nozzle 7 by a pump 8 through a piping 9.

The multiple nozzle 7 is constructed to be vibrated by an vibrator 7A. The core liquid 1 and the encapsulating liquid 3 are blown out in the air from this multiple nozzle 7 and fallen into hardening liquid which will be described hereunder and formed into seamless capsules SC of a multi-layer droplet type.

Furthermore, hardening liquid 10, for solidifying multi-layer droplets blown out of the multiple nozzle 7 during processes of manufacturing the seamless capsules SC, is stored in a hardening liquid tank 11, caused to flow out into an inclined groove 13 having U-shaped section (a droplet conveying means, i.e., a flow course for the hardening liquid) through a valve 12, and further, adapted to flow down into a hardening vessel 14.

This hardening vessel 14 has a section of a cylindrical shape in which droplets are cooled and solidified. At an opening on the top thereof, a discharging end (bottom end) of the groove 13 having U-shaped section is inserted obliquely into the hardening vessel 14 in a direction, preferably, tangent to the cylindrical section of the hardening vessel 14.

Accordingly, as shown in FIGS. 2 and 3, the hardening liquid 10 flowing into the hardening vessel 14 from the groove 13 having U-shaped section flows down along an inner wall of the hardening vessel 14, while forming a helical flow 10A, and also, the multi-layer droplets accompanied by the hardening liquid 10 is fallen, moving along a helical locus in the hardening vessel 14.

Such an arrangement is adopted that a pipe 15 is connected to the center of the bottom, having a substantially inverted circular cone shape, of the hardening vessel 14, and the seamless capsules SC cooled and solidified in the hardening vessel 14 flow down into a separating tank 16 together with the hardening liquid 10 from the bottom of the hardening vessel 14 through the pipe 15.

A slant perforated member 17 is provided on the top of the separating tank 16 and this slant perforated member 17 is of a construction having multiple pores each having a size not permitting the seamless capsules SC flowing out of the pipe 15 to pass therethrough, so that the seamless capsules SC flowing down onto the slant perforated member 17 move along an inclined surface of the slant perforated member 17, turning around forwardly, and are recovered into a product recovering vessel 18.

On the other hand, the hardening liquid 10 flowing down onto the slant perforated member 17 from the pipe 15 passes through the multiple pores of the slant perforated member 17 and flows down into the separating tank 16.

The hardening liquid 10 in the separating tank 16 is delivered under pressure by a pump 19 into a cooling tank 21 through a piping 20. The hardening liquid 10 in the cooling tank 21 is cooled to a predetermined temperature by a cooler 22, and thereafter, returned by a pump 23 into the hardening liquid tank 11 through a piping 24.

Action of this embodiment will hereunder be described.

First, the core liquid 1 and the encapsulating liquid 3 respectively supplied from the core liquid tank 2 and the coating liquid tank 4 are blown out into the air from the multiple nozzle 7 vibrated by the vibrator 7A and formed into the multi-layer droplets.

The multi-layer droplets are dropped into the groove 13 having U-shaped section, accompanied by the flow of the hardening liquid 10 flowing through the groove 13 and flow down into the hardening vessel 14 along the slant of the groove 13.

The groove 13 having U-shaped section is orientated in a direction tangent to the circular sectional shape of the hardening vessel 14, so that the flow of the hardening liquid 10 from the groove 13 having U-shaped section is fallen in the hardening vessel 14, forming the helical flow 10A while flowing into the hardening vessel 14 as shown in FIGS. 2 and 3.

Accordingly, the multi-layer droplets flowing into the hardening vessel 14 together with the hardening liquid 10 are fallen, moving helically along a locus of the helical flow 10A of the hardening liquid 10.

As a result, the length of flow course of the multi-layer droplets in the hardening vessel 14 is very much lengthened as compared with a rectilinear flow course, so that the time of contact between the multi-layer droplets and the hardening liquid 10 can be satisfactorily lengthened.

In this embodiment, with this arrangement, the solidifying of the multi-layer droplets is satisfactorily carried out and the disadvantages of deformation of the particles of droplets, mutual adhesion between the particles and agglomeration, breakage of solidified membranes and the like can be avoided, so that the seamless capsules of high quality can be obtained.

Further, a hardening vessel 14 in the apparatus of this embodiment is formed of a cylinder having an inner diameter several times larger than that of the flow course of the groove 13 having U-shaped section as being a droplet conveying means, whereby a linear velocity of the hardening liquid in this part becomes by far slower than the linear velocity in the flow course of the groove 13 having U-shaped section, so that the time of contact can be further lengthened as for the substantial length of the flow course of the droplets.

In this case, if the length of the groove 13 having U-shaped section is selected such that the solidifying proceeds to some extent before the droplets reach the hardening vessel 14, then the problem of mutual adhesion between the droplets can be obviated.

The multi-layer droplets which have completed the solidifying passed through the hardening vessel 14 and the pipe 15, are separated on the slant perforated member 17 of the separating tank 16 and recovered into the product recovering tank 18.

Figure 4:
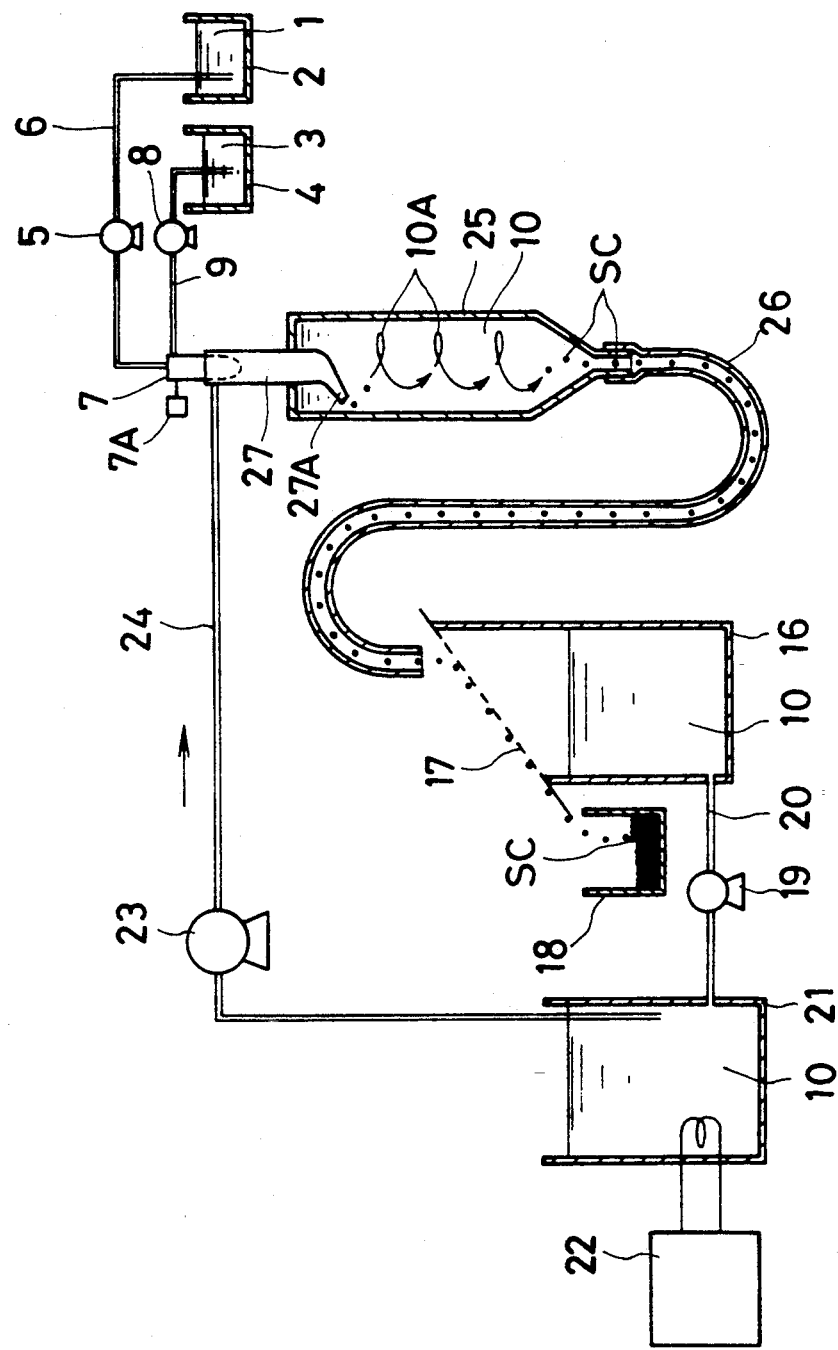
FIG. 4 is a schematic explanatory view showing one embodiment in which the present invention is applied to the apparatus for manufacturing seamless capsules of an in-liquid nozzle type.
Figure 5:
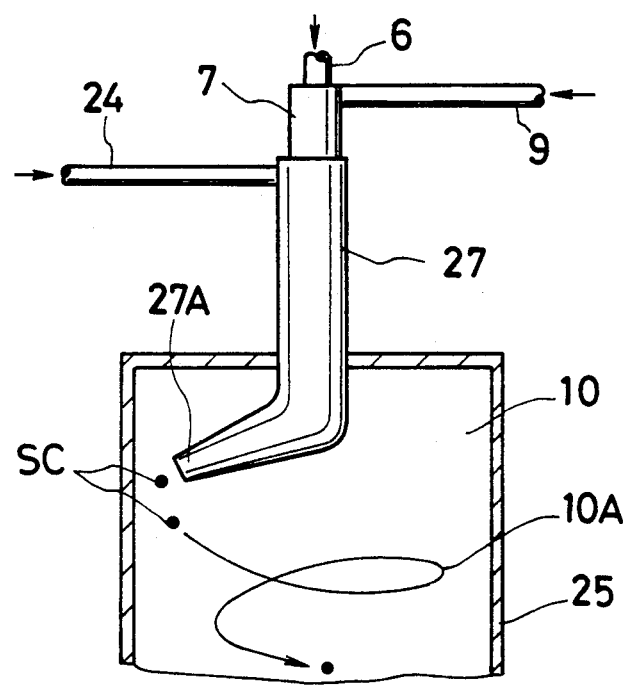
FIG. 5 is an enlarged partially longitudinally sectional view showing one embodiment of the hardening vessel in the embodiment shown in FIG. 4.
Figure 6:
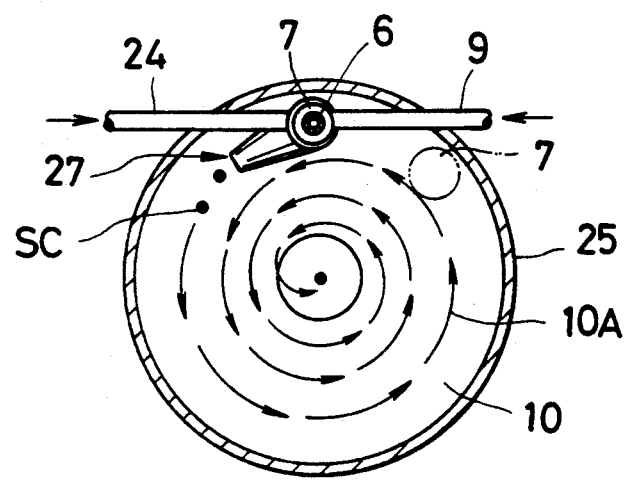
FIG. 6 is a schematically enlarged horizontally sectional view showing the hardening vessel shown in FIG. 5.

Subsequently, FIG. 4 is the schematic explanatory view showing another embodiment in which the present invention is applied to the apparatus for manufacturing seamless capsules of the in-liquid nozzle type, FIG. 5 is the enlarged partially longitudinally sectional view showing one embodiment of the hardening vessel in the embodiment shown in FIG. 4, and FIG. 6 is the schematically enlarged horizontally sectional view showing the hardening vessel shown in FIG. 5.

In the embodiments shown in FIGS. 4 to 6, portions corresponding to the embodiments shown in FIGS. 1 to 3 are designated by the same reference characters, thereby avoiding repeated descriptions.

Since the apparatus for manufacturing seamless capsules in the embodiment shown in FIGS. 4 to 6 is of the construction of the in-liquid nozzle type, such an arrangement is adopted that the multiple nozzle 7 is inserted into a hardening liquid supply tube 27 as being the hardening liquid supply means for cooling and solidifying the multi-layer droplets by use of the hardening liquid 10, and the core liquid 1 and the encapsulating liquid 3 are blown out into the hardening liquid 10 in this hardening liquid supply tube 27 such that the encapsulating liquid 13 covers the whole periphery of the core liquid 1.

In this embodiment, the hardening liquid supply tube 27 is inserted into the hardening vessel 25 from above.

The top portion of this hardening liquid supply tube 27 is connected to the piping 24, while the bottom portion thereof has an outwardly and slightly downwardly bent supply port portion 27A which is orientated in a direction, preferably, tangent to the circularly sectional shape of the hardening vessel 25.

With this arrangement, when the hardening liquid 10 passes through the outer periphery of the multiple nozzle 7 in the hardening liquid supply tube 27 and is discharged from the supply port portion 27A, the hardening liquid 10 forms the helical flow 10A in the hardening vessel 25, accompanying the multi-layer droplets in the helical flow 10A.

Accordingly, in this embodiment, the core liquid 1 and the encapsulating liquid 3 which are blown out of the multiple nozzle 7 are formed into the multi-layer droplets in the hardening liquid 10 in the hardening liquid supply tube 27, thereafter, blown out of the supply port portion 27A of the hardening liquid supply tube 27 in a direction tangent to the hardening vessel 25 thereinto, being accompanied by the hardening liquid 10, and are solidified through the agency of the hardening liquid 10 as they are helically fallen together with the helical flow 10A of the hardening liquid 10 in the hardening vessel 25, thus forming the seamless capsules SC.

The seamless capsules SC thus formed move from an outlet end of the hardening vessel 25, pass a pipe 26, flow down together with the hardening liquid 10 onto the slant perforated member 17 of the separating tank 16, separated from the hardening liquid 10 on the slant perforated member 17, and turn around on the inclined surface of the slant perforated member 17 to be recovered into the product recovering vessel 18.

In this second embodiment, the hardening liquid 10 discharged from the supply port portion 27A of the hardening liquid supply tube 27 is discharged in the direction tangent to a cylindrical inner wall surface of the hardening vessel 25, thereby forming the helical flow 10A in the hardening vessel 25.

Then, the multi-layer droplets blown out into and formed in the hardening liquid 10 in the hardening liquid supply tube 27, after being brought into contact with the hardening liquid 10 in the hardening liquid supply tube 27, are fallen downwardly in a substantially rectilinear direction in the hardening liquid supply tube 27. However, after discharged from the supply port portion 27A, the multi-layer droplets are fallen along the helical flow 10A of the hardening liquid 10 in the hardening vessel 25, moving in the helical flow, and contact the hardening liquid 10 for a long period of time.

Accordingly, in this embodiment also, the multi-layer droplets are in contact with the hardening liquid 10 for the satisfactorily long time, so that the satisfactory seamless capsules SC with no deformation, adhesion and agglomeration of the droplets can be obtained.

Further, the hardening vessel 25 in the apparatus of this embodiment has the inner diameter having the diameter of several times larger than that of the piping of the hardening liquid supply tube 27 as being the hardening liquid supply means, whereby, the linear velocity of the hardening liquid in this part is by far slower than the linear velocity in the piping of the hardening liquid supply tube 27, so that the time of contact can be further lengthened as for the substantial length of the flow course of the droplets.

In this case, if the length of the hardening liquid supply tube 27 or the droplet conveying means is selected such that the solidifying is progressed to some extent before the droplets reach the hardening vessel 25, then the problem of the mutual adhesion between the droplets can be avoided.

Incidentally, as indicated by a two-dot chain line in FIG. 6, the multiple nozzle 7 may be provided in a non-coaxial manner as formed separately of the hardening liquid supply tube 27 at the outside thereof in the hardening vessel 25.

Figure 7:
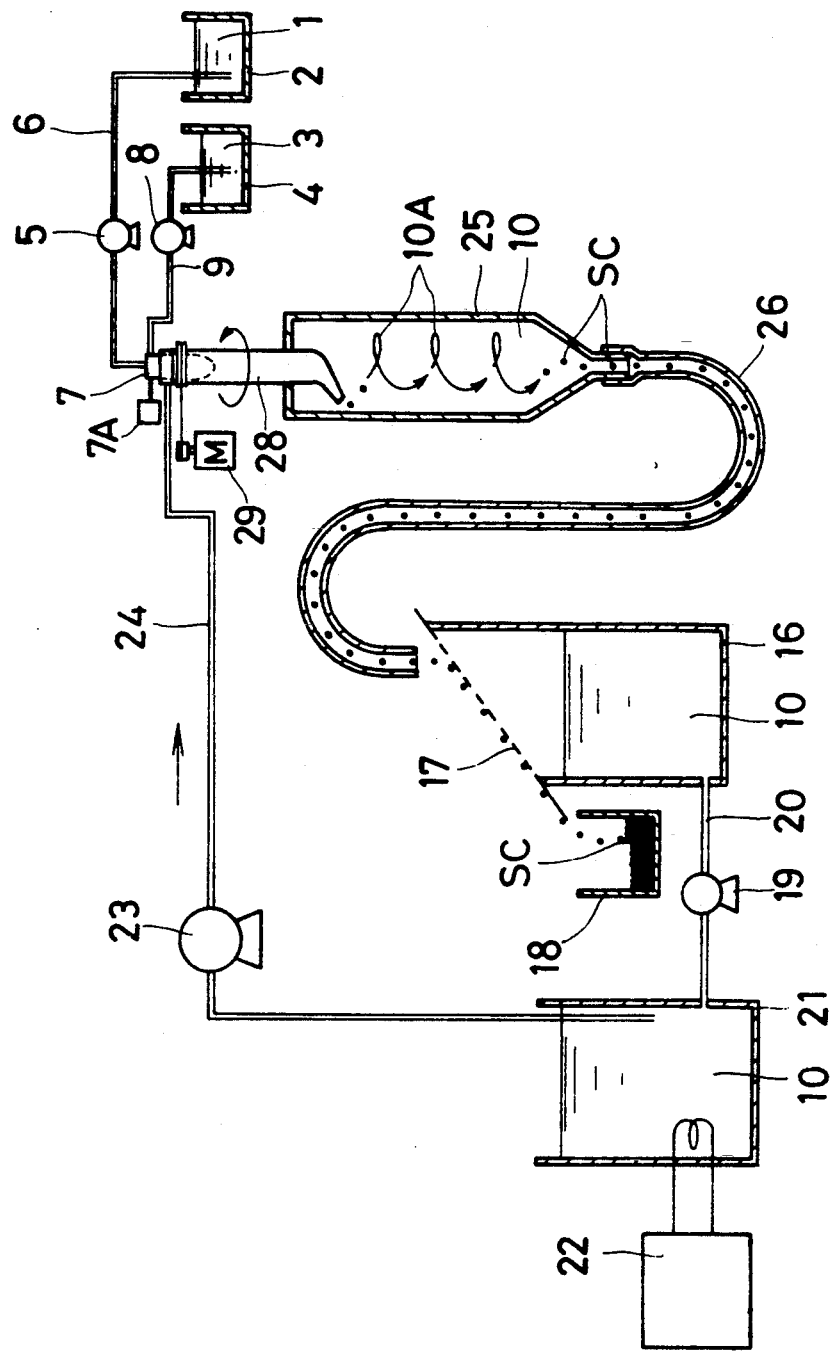
FIG. 7 is a schematic explanatory view showing another embodiment in which the present invention is applied to the apparatus for manufacturing seamless capsules of the in-liquid nozzle type.
Figure 8:
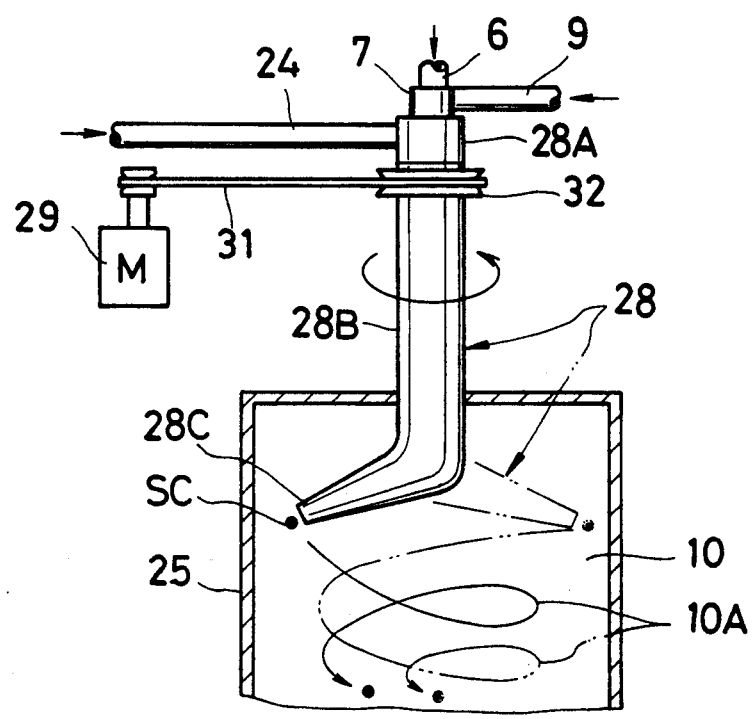
FIG. 8 is an enlarged partially longitudinally sectional view showing the hardening vessel in the embodiment shown in FIG. 7.
Figure 9:
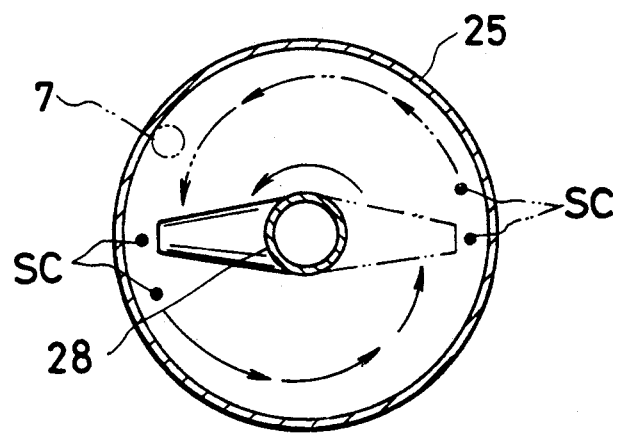
FIG. 9 is a schematically enlarged horizontally sectional view showing the hardening vessel shown in FIG. 8.

FIG. 7 is the schematic explanatory view showing another embodiment in which the present invention is applied to the apparatus for manufacturing seamless capsules of the in-liquid nozzle type, FIG. 8 is the enlarged partially longitudinally sectional view showing one embodiment of the hardening vessel in the embodiment shown in FIG. 7, and FIG. 9 is the schematically enlarged horizontally sectional view showing the hardening vessel shown in FIG. 8.

This third embodiment is similar to the second embodiment, however, the two embodiments are different from each other in that, differing from the hardening liquid supply tube 27 in the second embodiment, a hardening liquid supply tube 28 in this embodiment is provided rotatably about a vertical axis.

That is, the hardening liquid supply tube 28 in this embodiment is disposed at a position of an axis of the hardening vessel 25 at the outside thereof, and has a tubular construction including a fixed upper portion 28A connected thereto with the piping 24 for supplying the hardening liquid 10 and a lower portion 28B, a bottom end portion of which is inserted into the hardening liquid 10 in the hardening vessel 25, rotatably by a rotatably driving source 29 such as a motor.

The top of the lower portion 28B of this hardening liquid supply tube 28 is rotatable with respect to a top wall of the hardening vessel 25 through a bearing 30.

Furthermore, the end portion of the lower portion 28B is formed into a bent shape as a supply port portion 28C orientated outwardly and slightly downwardly so as to produce a spinning flow, i.e., helical flow in the hardening vessel 25.

Further, the rotatably driving source 29 is transmittably connected to a sprocket 32 of the lower portion 28B of the hardening liquid supply tube 28 through a belt 31.

Accordingly, in this embodiment also, in the hardening liquid supply tube 28, the droplets are blown out of the multiple nozzle 7 into and formed in the hardening liquid 10, and are fallen downwardly in the substantially rectilinear direction. However, the hardening liquid 10 blown out of the supply port portion 28C of the lower portion 28B of the hardening liquid supply tube 28 rotatable coaxially with the hardening vessel 25 by the rotatably driving source 29 is spun in the hardening liquid 10 in the hardening vessel 25 and forms the helical flow 10A. The multi-layer droplets are fallen, moving helically as accompanied by this helical flow 10A.

As a result, the length of the flow course of the multi-layer droplets is very much lengthened, whereby the multi-layer droplets are in contact with the hardening liquid 10 for the satisfactorily long time, so that the satisfactory seamless capsules SC can be manufactured.

Furthermore, in this embodiment, even if the linear velocity of the hardening liquid in the hardening vessel 25 is slow, the intervals between the droplets are made larger by the rotation of the supply port portion 28C, so that a risk of the mutual adhesion between the droplets can be advantageously avoided.

Incidentally, in this embodiment also, except that the multiple nozzle 7 is provided in the hardening liquid supply tube 28, the multiple nozzle 7 may be provided on the non-coaxial manner as a member formed separately of the hardening liquid supply tube at the outside thereof.

The invention by the present inventors has been described in detail with reference to the embodiments as explained above, however, the present invention should not be limited to the above embodiments, and, needless to say, the present invention can be variously modified within the scope of the invention.

For example, as the multiple nozzle, a triple nozzle may be adopted except for the double nozzle, and various vibration types can be utilized for producing the multi-layer droplets. Of course, in place of the multiple nozzle, a single nozzle for blowing out only the droplets of a single layer may be adopted.

Furthermore, the various ingredients of the inner layer and the outer layer of the multi-layer droplets of the seamless capsule may be desirably adopted.

Further, as the constructions of the hardening liquid supply tube, any construction other than those shown in the above embodiments may be adopted.

The followings are brief explanations of the effects attained by the typical ones out of the inventions disclosed in the present application.

(1) The hardening liquid in the hardening vessel produces the helical flow and the droplets are accompanied by the helical flow, whereby the droplets are fallen along the helical locus in the hardening vessel. Accordingly, the length of the flow course of the droplets becomes very long and the time of contact between the droplets and the hardening liquid is satisfactorily lengthened, so that the satisfactory seamless capsules can be obtained without the disadvantages of the deformation of the droplets, mutual adhesion between the droplets and agglomeration and the breakage of the droplets.

(2) Despite that the length of the flow course of the droplets becomes very long due to the falling helical locus, small dimensions of the devices such as the hardening vessel suffice and the construction is simplified.

(3) The droplet conveying means and the hardening liquid supply means are orientated in the direction tangent to the hardening vessel, so that the forming of the spinning helical flow can be formed satisfactorily.

(4) The hardening liquid supply means is rotatably provided in the hardening vessel, so that the spinning helical flow for solidifying can be reliably formed.

(5) The present invention can be widely applied to the cases in which at least the outermost portions of the droplets are brought into contact with the hardening liquid to thereby manufacture the seamless capsules. Particularly, when the outermost portions of the droplets are solidified with cooling liquid, such a particularly high effect that the apparatus can be made small-sized and so forth can be obtained.

What is claimed is:

1. A method of manufacturing seamless capsules, wherein, in manufacturing the seamless capsules by bringing at least the outermost portions of droplets into contact with a hardening liquid to solidify the droplets, said droplets are fallen moving helically in at least a part of the hardening liquid.

2. The method of manufacturing seamless capsules as set forth in claim 1, wherein said hardening liquid for conveying said droplets is supplied in a direction tangent to a circular section of a hardening vessel.

3. The method of manufacturing seamless capsules as set forth in claim 1, wherein said hardening liquid for conveying said droplets is blown out in a hardening vessel while a hardening liquid supply tube is rotated.

4. The method of manufacturing seamless capsules as set forth in claim 1, wherein solidifying of said droplets is carried out by cooling solidifying with said hardening liquid.

5. An apparatus for manufacturing seamless capsules, wherein at least outermost portions of droplets are brought into contact with a hardening liquid to be solidified to thereby manufacture the seamless capsules, characterized in that said apparatus comprises: a nozzle for blowing out said droplets in air; a hardening vessel, at least a part of which is formed into a straightly erected cylindrical shape; and a droplet conveying means orientated in a direction tangent to said hardening vessel, for conveying said droplets blown out of said nozzle, being accompanied by said hardening liquid; and is constructed such that said hardening liquid is supplied in the direction tangent to said hardening vessel so that said droplets can be fallen in a helical manner in said hardening vessel.

6. The apparatus for manufacturing seamless capsules as set forth in claim 5, wherein said droplet conveying means is formed of a hardening liquid flow course orientated in a direction tangent to an upper portion of said hardening vessel such that said droplets blown out into the air from said nozzle is supplied in the direction tangent to said hardening vessel thereinto together with the flow of said hardening liquid.

7. The apparatus for manufacturing seamless capsules as set forth in claim 5, further comprising cooling means for cooling said hardening liquid to a predetermined temperature so that solidifying of said droplets is carried out by cooling solidifying with said hardening liquid.

8. An apparatus for manufacturing seamless capsules, wherein at least outermost portions of droplets are brought into contact with a hardening liquid to be solidified to thereby manufacture the seamless capsules, characterized in that said apparatus comprises: a hardening vessel, at least a part of which is formed into a straightly erected cylindrical shape; a hardening liquid supply means, a supply port of which is orientated in a direction tangent to said hardening vessel, for supplying said hardening liquid in the direction tangent to said hardening vessel; and a nozzle for blowing out said droplets into said hardening liquid in said hardening liquid supply means or said hardening vessel; and is constructed such that said droplets blown out of said nozzle into said hardening liquid are fallen in a helical manner in said hardening vessel.

9. The apparatus for manufacturing seamless capsules as set forth in claim 8, wherein said nozzle is inserted into said hardening liquid supply means.

10. The apparatus for manufacturing seamless capsules as set forth in claim 8, wherein said nozzle is provided as a member formed separately of said hardening liquid supply means in said hardening vessel.

11. The apparatus for manufacturing seamless capsules as set forth in claim 8, further comprising cooling means for cooling said hardening liquid to a predetermined temperature so that solidifying of said droplets is carried out by cooling solidifying with said hardening liquid.

12. An apparatus for manufacturing seamless capsules, wherein at least outermost portions of droplets are brought into contact with a hardening liquid to be solidified to thereby manufacture the seamless capsules, characterized in that said apparatus comprises: a hardening vessel, at least a part of which is formed into a straightly erected cylindrical shape; a hardening liquid supply means rotatably provided in said hardening vessel; a rotatably driving means for rotating said hardening liquid supply means; and a nozzle for blowing out said droplets into said hardening liquid in said hardening liquid supply means or said hardening vessel.

13. The apparatus for manufacturing seamless capsules as set forth in claim 12, wherein said hardening liquid supply means is constituted by a fixed upper portion connected thereto with a piping for supplying said hardening liquid and a lower portion rotatably by said rotatably driving means independently of said upper portion, and a discharging end portion of said lower portion is bent outwardly.

14. The apparatus for manufacturing seamless capsules as set forth in claim 12, wherein said nozzle is inserted into said hardening liquid supply means.

15. The apparatus for manufacturing seamless capsules as set forth in claim 12, wherein said nozzle is provided on a non-coaxial manner as a member formed separately of said hardening liquid supply means.

* * * * *